Nov. 25, 1924.
P. A. MYERS
1,516,572
BEARING
Original Filed Aug. 30, 1920   2 Sheets-Sheet 1
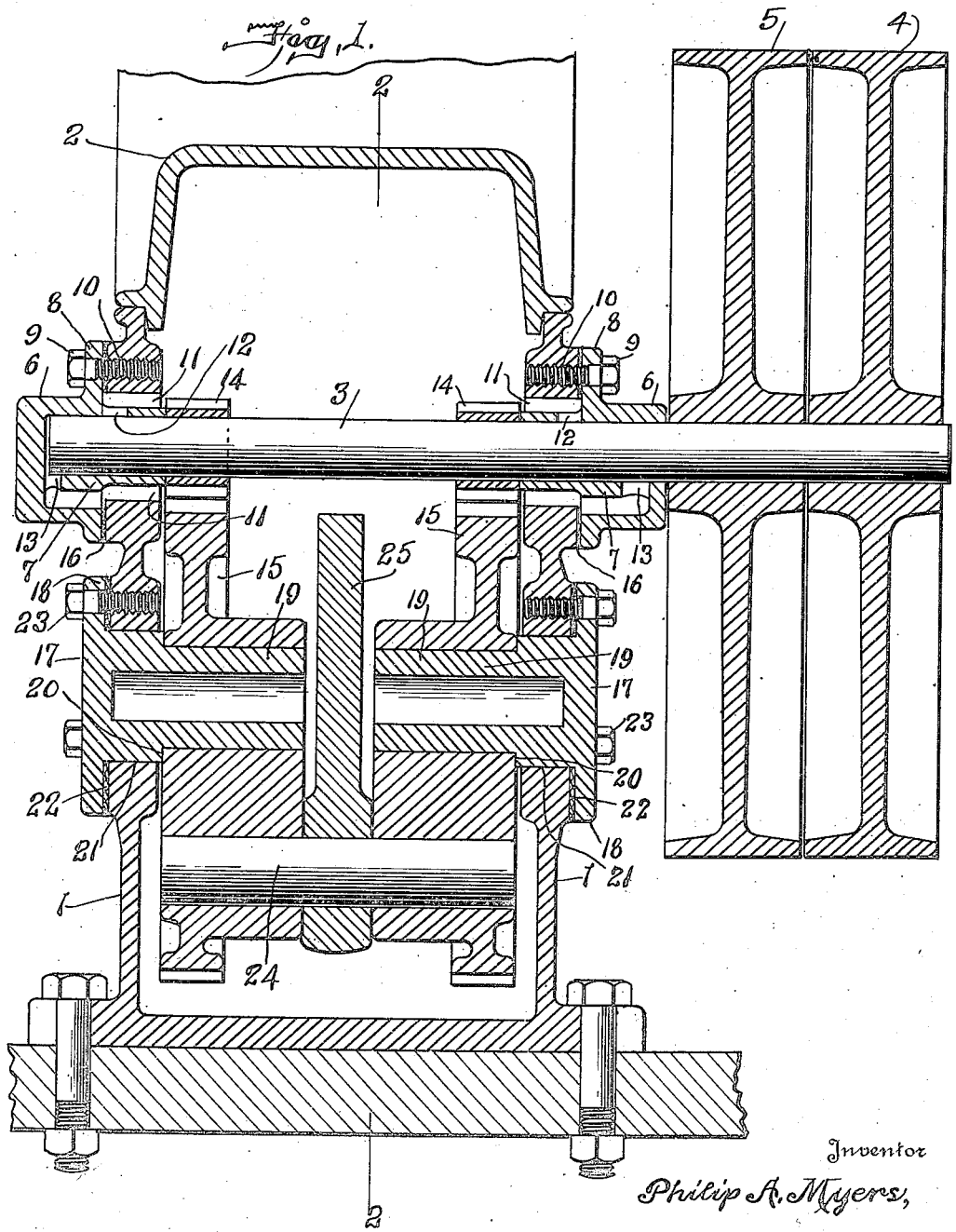

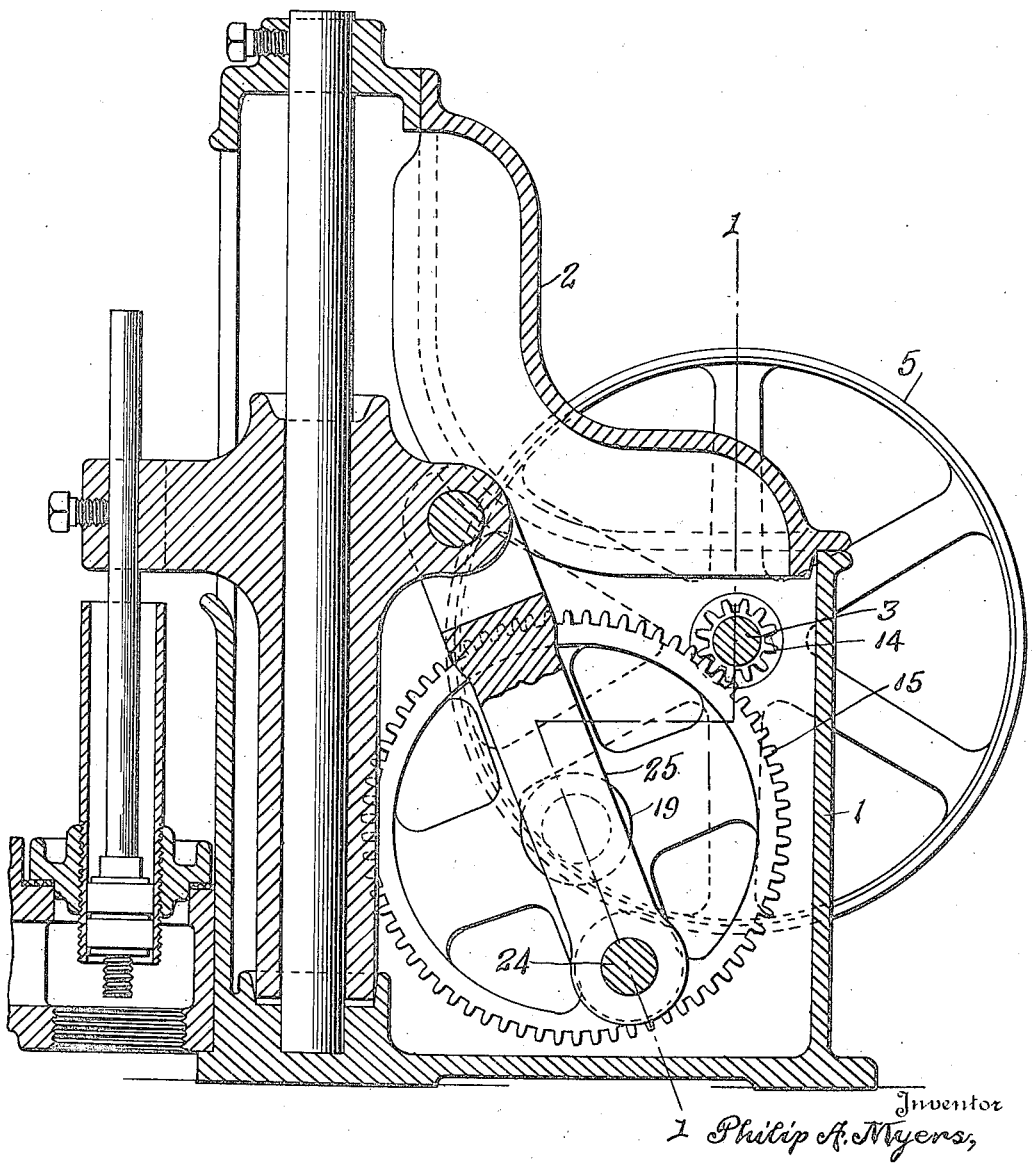

Patented Nov. 25, 1924.

1,516,572

UNITED STATES PATENT OFFICE.

PHILIP A. MYERS, OF ASHLAND, OHIO, ASSIGNOR TO THE F. E. MYERS AND BROTHER COMPANY, OF ASHLAND, OHIO, A CORPORATION OF OHIO.

BEARING.

Original application filed August 30, 1920, Serial No. 407,024. Divided and this application filed November 3, 1922. Serial No. 598,899.

*To all whom it may concern:*

Be it known that I, PHILIP A. MYERS, a citizen of the United States, residing at Ashland, in the county of Ashland and State of Ohio, have invented certain new and useful Improvements in Bearings, of which the following is a specification, reference being had therein to the accompanying drawing.

This invention relates to improved bearings for the shafts employed in a power head for use in operating pumps, usually domestic pumps which stand in a vertical position.

In my application, Ser. No. 407,024, filed Aug. 30th, 1920, Patented No. 1,437,988, Dec. 5, 1922, for improvements in this class of power heads I set forth and show a power head with which the present improvements are used or of which they form a part. These improvements relate to removable bearings for the driving shaft and removable bearings and stud shafts for the driven gears which constitute a part of said power head. The peculiarities and advantages of these bearings will be set forth hereinafter.

In the accompanying drawings;

Fig. 1 is a transverse vertical sectional view of such a power head with these improved bearings applied thereto, the view being taken on the line 1—1 of Fig. 2;

Fig. 2 is a vertical sectional view taken on the line 2—2 of Fig. 1.

I will not describe in detail any of the mechanism shown herein, except that which forms the subject matter of this present invention, as such mechanism set forth in my said application 407,024 referred to above. Generally speaking the numeral 1 designates a casing, usually of cast iron, for containing the pump-rod operating-mechanism and a quantity of lubricant. A cover 2 is usually applied to the casing to exclude dust and dirt.

I will first describe the bearings which are used to support the driving shaft 3 which is driven by a tight pulley 4 which carries a loose pulley 5, on which the belt may be shifted when the mechanism is not to be operated. These bearings consist of the cuplike portion 6 and a sleeve 7 cast integrally and provided with a flange 8 having holes for the insertion of screws 9 which are used to secure the bearings to the wall of the casing, the latter having screw-threaded apertures 10 to receive these screws. The outer end of the cap portion forms a closure to exclude dust and dirt and to prevent the outflow or discharge of the lubricant which finds its way to the shaft 3 by being picked up by the gears which dip into the oil within the casing. The sleeves 7 extend into openings 11 in the casing and are provided with an opening 12 for the more ready admission of the lubricant and also with an opening 13 to permit any lubricant entering the opening 11 to more readily reach the end of the shaft 3.

Mounted on the shaft 3 are pinions 14 which mesh with driven gears 15. It will be noted that the diameter of the openings 11 in the casing wall is greater than that of the pinions. The purpose is to admit of the removal of the shaft 3, together with the pinions 14 by detaching the bearings 6 next to the pulleys. This also facilitates in assembling the parts in the course of manufacture.

A gasket or washer 16 is used to prevent leakage of the lubricant.

Thus it will be seen that I provide simple, strong and readily applied bearings for the driving shaft 3 and which may be readily assembled with the other parts and yet which by the attachment of one of them will permit of the removal of the entire shaft and its two pinions.

Referring now to the bearings for the driven gears 15 they each consist of a plate 17 having a flange 18 and a sleeve 19 with a shoulder 20. The sleeve extends through an opening 21 in the casing, a gasket or washer 22 makes an oil tight joint and screws 23 secure the plate 17 to the casing. The sleeve 19 constitutes on its exterior a stud bearing, that is, a bearing which projects inward from the casing wall and on which is mounted the driving gear 15. Lubricant will work into this bearing as it drops down from the upper part of the gearing and pinions.

It will now be seen that these stud bearings are readily applicable to the casing and readily removable and that they afford a strong and efficient support for the driven gears 15 which perform the labor of operating through the interconnecting wrist pin 24 the pitman 25 and thence the other devices which transmit the power and motion to the pump piston rod.

These stud bearings also aid in the ready and quick assembling of the parts when the gears are to be mounted.

Having thus fully described my invention, what I claim as new and desire to secure by Letters Patent, is:—

1. In a power head, the combination with a casing adapted to contain a quantity of lubricant and operating mechanism, and provided with openings in its opposite walls, of a set of bearings consisting of cups and projecting sleeves each of which extends through one of said openings and is of less diameter than such opening to form a lubricant passage, and fastening devices to removably attach such bearings to the casing.

2. In a power head, the combination with a casing having an opening in a wall thereof, of a removable bearing consisting of a cup provided with a sleeve which extends through said opening and is of less diameter to provide a lubricant passage, means to detachably secure the cup to the casing, and a driving shaft mounted within the sleeve and provided with a pinion of less diameter than said opening in the casing, whereby when the bearing is removed the shaft and its pinion can be inserted or withdrawn by passing them through said opening.

3. In a power head, the combination with a casing having an opening, of a bearing consisting of a cup provided with a sleeve of smaller diameter than said opening and further provided with openings which lead from the shaft within this bearing to the space between the sleeve and said opening to admit lubricant through said space and openings to the shaft, and means to detachably secure said bearing to the casing.

In testimony whereof, I affix my signature.

PHILIP A. MYERS.